United States Patent
Zheng et al.

(10) Patent No.: US 10,694,491 B2
(45) Date of Patent: Jun. 23, 2020

(54) SYSTEMS AND METHODS FOR DETECTING MOTION BASED ON CHANNEL CORRELATION IN WIRELESS COMMUNICATION SIGNALS

(71) Applicant: Marvell World Trade Ltd., St. Michael (BB)

(72) Inventors: Xiayu Zheng, San Jose, CA (US); Xilin Cheng, Menlo Park, CA (US); Zhipei Chi, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/547,337

(22) Filed: Aug. 21, 2019

(65) Prior Publication Data

US 2020/0068522 A1 Feb. 27, 2020

Related U.S. Application Data

(60) Provisional application No. 62/720,799, filed on Aug. 21, 2018.

(51) Int. Cl.
| | |
|---|---|
| *H04W 64/00* | (2009.01) |
| *H04B 17/391* | (2015.01) |
| *H04B 17/336* | (2015.01) |
| *H04B 17/318* | (2015.01) |

(52) U.S. Cl.
CPC ........ *H04W 64/003* (2013.01); *H04B 17/318* (2015.01); *H04B 17/336* (2015.01); *H04B 17/391* (2015.01)

(58) Field of Classification Search
None
See application file for complete search history.

(56) References Cited

U.S. PATENT DOCUMENTS

2012/0113844 A1* 5/2012 Krishnamurthy ..... H04L 1/0026
370/252

* cited by examiner

*Primary Examiner* — Suhail Khan

(57) ABSTRACT

This disclosure describes systems and methods for detecting motion based on channel correlation in wireless communication signals. A receiver at a first wireless communication device is capable of wirelessly communicating with a second wireless communication device. The first wireless communication device is configured to receive from the second wireless communication device via two or more subcarriers a first packet and a channel correlation for the first packet across the two or more subcarriers. Control circuitry is configured to estimate a channel energy difference for the receiver based on the channel correlation for the first packet. A motion detection decision is then made based on the estimated channel energy difference.

20 Claims, 4 Drawing Sheets

SYSTEMS AND METHODS FOR DETECTING MOTION BASED ON CHANNEL CORRELATION IN WIRELESS COMMUNICATION SIGNALS

CROSS-REFERENCE TO RELATED APPLICATION

This disclosure claims the benefit under 35 U.S.C. § 119(e) of copending, commonly-assigned U.S. Provisional Patent Application No. 62/720,799, filed on Aug. 21, 2018, which is hereby incorporated by reference herein in its entirety.

FIELD OF USE

The present disclosure relates to wireless communication systems and, more particularly, to a method and apparatus for detecting motion based on channel correlation in a wireless communication system.

BACKGROUND OF THE DISCLOSURE

The background description provided herein is for the purpose of generally presenting the context of the disclosure. Work of the inventors hereof, to the extent the work is described in this background section, as well as aspects of the description that do not otherwise qualify as prior art at the time of filing, are neither expressly nor impliedly admitted to be prior art against the present disclosure.

Movement detection systems are often installed in homes and/or offices for security with their main purpose being intrusion detections through a door, window, or fence. Traditionally, in the field of private security for indoor spaces, different types of devices capable of detecting an intrusion (or a motion) into a home and/or office are used. For example, one or more of the following types of detection devices may be used:

(1) Volumetric sensors which detect changes in the volume of the measuring area and translate them into motion detection;

(2) Door-opening sensors that detect when a door or window is opened or closed;

(3) Infrared barrier sensors that detect the passage of an object between their transmitters and receivers;

(4) Vibration or glass break sensors that detect vibration in crystals when they are beaten or suffer a break;

Or (5) Security camera that detect object movement through processing video frames;

These existing systems typically include a plurality of sensors (e.g., passive infrared motion detector, hermetically sealed reed switches, etc.) to be installed in the homes, as well as installation of cameras. Such installations may be prohibitively expensive and require significant installations costs (e.g., installation of Ethernet wires, power cables, etc.).

SUMMARY

Embodiments described herein provide a system for detecting motion based on channel correlation in wireless communication signals. In one aspect, a receiver at a first wireless communication device is capable of wirelessly communicating with a second wireless communication device, and the first wireless communication device is configured to receive from the second wireless communication device via two or more subcarriers a first packet and a channel correlation for the first packet across the two or more subcarriers. In some examples, the first packet is a short packet, which, as used herein (and as described in further detail in U.S. patent application Ser. No. 16/395,579, entitled Systems and Methods for Detecting Motion Using Wireless Communication Signals, filed on Apr. 26, 2019, which is hereby incorporated by reference herein in its entirety), generally refers to a packet that has a nulling matrix applied to it and that the system (e.g., an AP) periodically transmits to a client station within a sounding interval to enable the client station to estimate a received signal strength for the short packet. Control circuitry is configured to estimate a channel energy difference for the receiver based on the channel correlation for the first packet, and make a motion detection decision based on the estimated channel energy difference.

In another aspect, the control circuitry is further configured to determine a channel correlation for a reference packet across the two or more subcarriers, estimate the channel energy difference for the receiver by computing a difference between the channel correlation for the reference packet and the channel correlation for the first packet across subcarriers, and make the motion detection decision based on the estimated channel energy difference.

In a further aspect, the control circuitry is further configured to compare the estimated channel energy difference to a threshold, with the motion detection decision being made based on a result of the comparing the determined channel correlation to the threshold.

In yet another aspect, the control circuitry is further configured to determine an average estimated channel energy difference based on a plurality of packets received by the receiver over a period of time, and compare the estimated channel energy difference to the average estimated channel energy difference. The motion detection decision is then made based on a result of the comparing the estimated channel energy difference to the average estimated channel energy difference computed over the period of time.

In one aspect, the receiver of the system, which may be an access point or a client station in various aspects, is further configured to wirelessly receive, from the second wireless communication device, a feedback packet including an average estimated channel energy difference based on a plurality of packets communicated between the first and second wireless communication devices over a period of time. The control circuitry is then further configured to compare the estimated channel energy difference to the average estimated channel energy difference, and make the motion detection decision based on a result of the comparing the determined channel correlation to the average estimated channel energy difference.

In another aspect, the receiver is further configured to periodically receive, from the second wireless communication device, a plurality of sounding packets, including a first sounding packet and a second sounding packet, with the reference packet being at least one of the first sounding packet or the second sounding packet, and the first packet being received in between receipt of the first sounding packet and the second sounding packet.

In a further aspect, the control circuitry is further configured to compare the estimated channel energy difference to a threshold and, in response to determining that the estimated channel energy difference is below the threshold, detect motion.

In yet another aspect, the control circuitry is further configured to compare the estimated channel energy difference to a threshold and, in response to determining that the estimated channel energy difference is above the threshold, detect an absence of.

In one aspect, the channel correlation for the first packet across the two or more subcarriers is determined by determining correlations of the first packet among adjacent subcarriers.

In another aspect, the first packet is received over a first channel of the first wireless communication device, and the control circuitry is further configured to make the motion detection decision based on statistical channel-correlation-based energy channel differences determined for the first channel of the first wireless communication device.

Embodiments described herein also provide a method for detecting motion based on channel correlation in wireless communication signals. In one aspect, the method comprises receiving, at a receiver of a first wireless communication device capable of wirelessly communicating with a second wireless communication device, a first packet from the second wireless communication device via two or more subcarriers. The first wireless communication device also receives from the second wireless communication device via two or more subcarriers a channel correlation for the first packet across the two or more subcarriers. A channel correlation is determined for the first packet across the two or more subcarriers. A channel energy difference for the receiver is estimated based on the channel correlation for the first packet. A motion detection decision is then made based on the estimated channel energy difference.

In yet another aspect, the method further comprises determining a channel correlation for a reference packet across the two or more subcarriers. The channel energy difference is estimated for the receiver by computing a difference between the channel correlation for the reference packet and the channel correlation for the first packet. The motion detection decision is then made based on the estimated channel energy difference.

In one aspect, the method further comprises comparing the estimated channel energy difference to a threshold, and detecting a presence of motion or an absence of motion based on comparison of the estimated channel energy difference to the threshold.

In another aspect, the method further comprises determining an average estimated channel energy difference based on a plurality of packets received by the receiver over a period of time. The estimated channel energy difference is compared to the average estimated channel energy difference, and the motion detection decision is made based on a result of the comparing the determined channel correlation to the average estimated channel energy difference computed over the period of time.

In a further aspect, the method further comprises wirelessly receiving, from the second wireless communication device, a feedback packet including an average estimated channel energy difference based on a plurality of packets communicated between the first and second wireless communication devices over a period of time. The estimated channel energy difference is compared to the average estimated channel energy difference, and the motion detection decision is made based on a result of the comparing the determined channel correlation to the average estimated channel energy difference.

In yet another aspect, the method further comprises periodically receiving, from the second wireless communication device, a plurality of sounding packets, including a first sounding packet and a second sounding packet, the reference packet includes at least one of the first sounding packet or the second sounding packet, and the first packet is received in between receipt of the first sounding packet and the second sounding packet.

In one aspect, the method further comprises comparing the estimated channel energy difference to a threshold and, in response to determining that the estimated channel energy difference is below the threshold, determining that motion has been detected.

In another aspect, the method further comprises comparing the determined estimated channel energy difference to a threshold and, in response to determining that the determined estimated channel energy difference is above the threshold, determining that an absence of motion has been detected.

In a further aspect, the channel correlation for the first packet across the two or more subcarriers is determined by determining correlations of the first packet among adjacent subcarriers.

In yet another aspect, the first packet is received over a first channel of the first wireless communication device, and the motion detection decision is made based on statistical channel-correlation-based energy channel differences determined for the first channel of the first wireless communication device.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Figure 1:
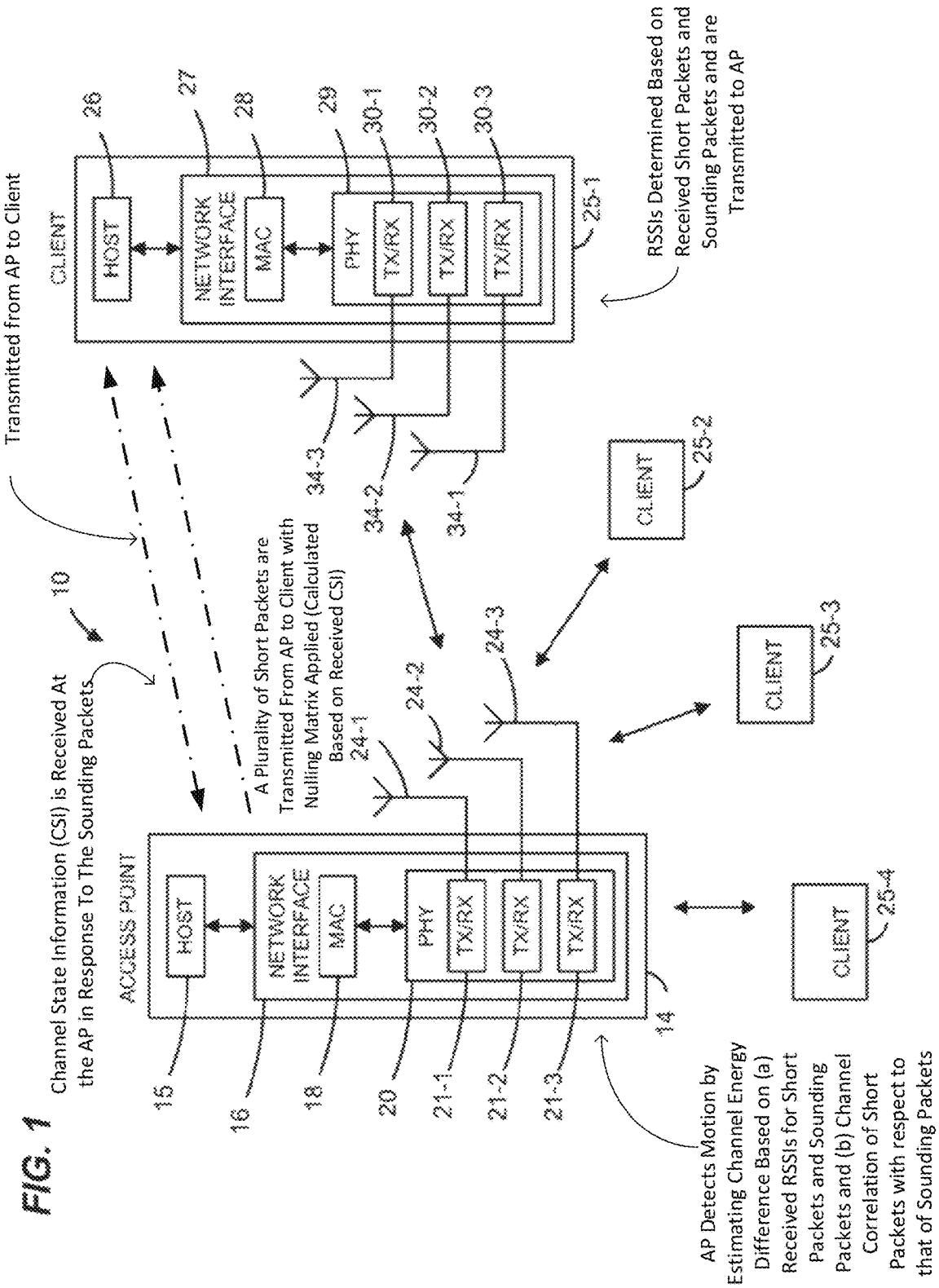
FIG. 1 is a schematic representation of a wireless communication system in accordance with some embodiments of the subject matter of this disclosure.

This disclosure describes methods and systems for detecting motion using wireless communication signals—e.g., Wi-Fi signals. Wireless local area networks (WLANs, e.g., Wi-Fi networks) typically include an access point (AP) and one or more client stations. The present disclosure describes a movement detection scheme for security in a home or another premises by using Wi-Fi signals from an AP, such as a multi-antenna AP. Although various aspects of the present disclosure are described in a context of WLAN signals, other types of suitable wireless communication signals may be used to achieve desirable results—e.g., Bluetooth signals, cellular communication signals, and the like.

The AP (e.g., part of a typical router) typically is required for any home/office WLAN setup. The present disclosure uses the wireless communication signals between the AP and one or more client stations present within the home/office to detect motion, thereby significantly reducing the costs and installations required for motion detection. In particular, the present disclosure makes use of a multi-antenna transmit beamforming procedure (including sounding and steering) that is compliant with various WLAN standards, such as Wi-Fi standards. WLAN standards such as the Institute for Electrical and Electronics Engineering (IEEE) 802.11n, 802.11ac, 802.11ah, and 802.11ax Standards describe multi-antenna transmit beamforming procedures (including sounding and steering). Specifically, in accordance with WLAN standards, the AP initiates transmit beamforming sounding procedures. Traditionally, the transmit beamforming procedures are trying to improve signal strength at the receiver (i.e., at client stations) by applying a steering matrix at the transmitter side (i.e., at the AP) to direct transmitted signals to a specific client station. The present disclosure goes a step further by using and/or modifying aspects of transmit beamforming sounding procedures (such as the transmission and receipt of sounding packets, short packets, and/or information ascertained from those packet transmissions) to detect motion.

The present disclosure, in at least some aspects, employs a technique, such as the technique described in U.S. patent application Ser. No. 16/395,579, entitled Systems and Methods for Detecting Motion Using Wireless Communication Signals, filed on Apr. 26, 2019, which is hereby incorporated by reference herein in its entirety, to construct at the transmitter (i.e., at the AP), based on the steering matrix obtained from a sounding procedure, a nulling matrix (or a nulling vector in the case of a single spatial stream signal) which is orthogonal to a channel direction (i.e., a statically allocated channel between the transmitter and the receiver) and which is used to null or mitigate any interference from other nearby signal or noise sources that may otherwise degrade wireless signals communicated to or from the AP. The AP calculates the nulling matrix based on channel state information received from the client station device and applies the nulling matrix to short packets in an effort to nullify or cancel out interference components that may otherwise be present in signals that are used to wireless transmit the short packets. Although much of the present disclosure relies on the transmission and reception of short packets, this is provided by way of example. In some implementations, other types of packets (such as a proprietary packet type generated for the specific purpose of motion detection) may be transmitted in between transmissions of sounding packets and used to detect motion in the manner described herein for short packets, as an addition to or as an alternative to using short packets.

During the interval between transmitting two sounding procedures, AP periodically sends to a receiver of the client station short packets with the nulling matrix applied thereto. The resulting signal at the receiver of the client station is consequently greatly degraded based on the application of the nulling matrix to the short packets. Thus, movement or intrusion into an area of coverage of the AP, for instance the home/office in which it is deployed, would change the channel state information (which according to the sounding procedure described in further detail below may be measured by the client station and transmitted to the AP by way of a feedback packet) of the statically allocated channel between the AP and the client station, and cause the nulling to be sub-optimal. That is, because the nulling matrix was determined to be optimal for the statically allocated channel when that channel lacks any CSI perturbation from an intrusion, when an intrusion later perturbs the statically allocated channel, the channel's CSI changes and the nulling matrix is no longer optimally tailored to the CSI for that channel. This causes the nulling that is performed using the nulling matrix to be sub-optimal when the channel is perturbed by motion or intrusion. Thus, the signal strength at the receiver (i.e., at the client stations) when the channel is perturbed by motion would be enhanced compared to the optimal nulling scenario that is present absent any such perturbations, thereby indicating that the presence of movement within the environment. The received signal strength (RSS) and/or channel energy change are then estimated at the receiver. A signal strength change threshold and/or a channel energy change threshold can be set to determine if motion (or an intrusion) is detected.

In some examples, the RSS can be measured from packet to packet to detect whether the channel has changed. Alternatively, the channel state information (CSI) difference from packet to packet can be compared to consider whether the channel is changed. The RSS scheme, however, has a low resolution that limits its effectiveness in practical scenarios. Conversely, the CSI difference scheme may improve the resolution if detection, however, it is limited by the CSI fixed-point on-chip implementation and it also requires significant computing and memory resources.

The transmit nulling based scheme described in U.S. patent application Ser. No. 16/395,579 can have similar or better detection performance compared to the CSI difference-based scheme at a receiver, depending upon how the CSI difference is calculated. The transmit nulling-based scheme, however, has some advantages over other schemes. For example, the transmit nulling-based scheme is advantageous over the CSI difference-based scheme in that it requires less processing and memory resources than the CSI difference-based scheme. For the transmit nulling-based scheme, the detection resolution is mainly dominated by precision of the compressed steering matrix (CSM), which is improved by making use of an explicit transmit beamforming sounding procedure, using, for example, the standard feedback codebook size. For implicit beamforming, the detection resolution is limited by the transmit/receive path difference calibration and compensation as well as the CSM precision.

Accordingly, a low-cost method of movement detection suitable for implementation in a home/office environment at least party using equipment that is readily available and already installed in many homes and offices. Moreover, the present disclosure provides an enhanced detection resolution or performance over even the transmit nulling-based scheme described in U.S. patent application Ser. No. 16/395,579. In particular, considering a system of the transmit nulling-based scheme with a single receive antenna, a steering vector from sounding can be expressed according to equation (1) below.

$$v_k = \frac{h_k^H}{\|h_k\|} + \Delta v_k \tag{1}$$

where $h_k$ is the true $1 \times N_{tx}$ channel vector at the $k^{th}$ subcarrier, $\Delta v_k$ is the $N_{tx} \times 1$ random vector due to quantization noise (codebook size in compression, transmit/receive fix-point implementation, and the like), and channel estimation error from thermal noise. The nulling vector is given by equations (2) below.

$$q_{k,tmp} = (I - v_k \cdot v_k^H) u_0 \quad (2)$$

$$q_k = \frac{q_{k,tmp}}{\|q_{k,tmp}\|}$$

Where there is no channel change (e.g., no perturbation or intrusion), the received signal at the $k^{th}$ subcarrier is given by equations (3) below.

$$\begin{aligned} y_k &= h_k \cdot q_k \cdot s + n_k \quad (3) \\ &= -\frac{1}{\|q_{k,tmp}\|} \left( \|h_k\| \cdot \Delta v_k^H + (h_k \cdot \Delta v_k) \left( \frac{h_k}{\|h_k\|} + \Delta v_k^H \right) \right) u_0 \cdot s + n_k \\ &\approx -\frac{1}{\|q_{k,tmp}\|} \left( \|h_k\| \cdot \Delta v_k^H + (h_k \cdot \Delta v_k) \frac{h_k}{\|h_k\|} \right) u_0 \cdot s + n_k \\ &= f(\Delta v_k, h_k) + n_k \end{aligned}$$

where the third equality is approximated by ignoring the quadratic term of $\Delta v_k$, which is usually very small with respect to the linear term. $f(\Delta v_k, h_k)$ is the function mainly composed of the linear term of the elements in $\Delta v_k$ with the coefficient of elements in $h_k$.

Where there is channel change such that the new channel is given by equation (4) below.

$$h_{k,new} = h_k + \Delta h_k \quad (4)$$

where $\Delta h_k$ is the $1 \times N_{tx}$ channel vector caused by the perturbation (e.g., people movement). The received signal is then given by equation (5) below.

$$\begin{aligned} y_k &= h_{k,new} \cdot q_k \cdot s + n_k \quad (5) \\ &\approx \Delta h_k \cdot q_k \cdot s + f(\Delta v_k, h_k) + n_k \end{aligned}$$

For the RSS difference-based (or channel energy-based) metric, equation (5) shows that the channel change can be detected only when the perturbation component $\Delta h_k \cdot q_k$ is strong enough compared to the noise/quantization component $f(\Delta v_k, h_k) + n_k$.

Considering that the perturbation component $\Delta h_k \cdot q_k$ is related to the multipath caused by the intrusion, it is highly correlated between the neighboring subcarriers, while the noise/quantization component $f(\Delta v_k, h_k) + n_k$ will be relatively random across the subcarriers. Accordingly, the present disclosure discloses a channel correlation-based scheme for enhancing detection performance. Some intrusions may cause channel perturbations (e.g., changes in CSI) that are too low in magnitude for prior systems to detect for a given noise level. However, because the scheme of the present disclosure measures the channel correlation that is caused by a perturbation component instead of (or in addition to) measuring received signal level changes caused by perturbations, and because channel correlation measurements are less impacted by noise level for random noise, the present disclosure is able to detect channel perturbations of lower intensity than can be detected by other systems.

FIG. 1 is a block diagram illustrating an example of a communication system, such as WLAN system 10, according to some embodiments described herein. The WLAN system 10 includes an access point (AP) 14 and multiple clients 25-1, 25-2, 25-3, and 25-4 (collectively clients 25). The AP 14 includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21-1, 21-2, 21-3 (collectively, transceivers 21), and the transceivers 21 are coupled to a plurality of antennas 24. Although three transceivers 21 and three antennas 24-1, 24-2, and 24-3 (collectively, antennas 24) are illustrated in FIG. 1, the AP 14 includes other suitable numbers (1, 2, 3, 4, 5, etc.) of transceivers 21 and antennas 24 in other embodiments. In some embodiments, the MAC processing unit 18 and the PHY processing unit 20 are configured to operate according to various legacy protocols.

The WLAN 10 includes a plurality of client stations 25. The client stations 25 can include access terminals (AT), wireless stations (STAs), mobile stations (MS), or other devices. Although four client stations 25 are illustrated in FIG. 1, the WLAN 10 includes other suitable numbers (1, 2, 3, 4, 5, etc.) of client stations 25 in various scenarios and embodiments. The client stations 25 (e.g., client station 25-1) can be configured to operate according to a communications protocol that supports MIMO communications (e.g., IEEE 802.11n, 802.11ac, or 802.11ax). In some instances, a client station 25 can be configured to operate according to another communication protocol (e.g., IEEE 802.11a, 802.11b, and/or 802.11g).

The client stations 25-1 includes a host processor 26 coupled to a network interface device 27. The network interface device 27 includes a MAC processing unit 28 and a PHY processing unit 29. The PHY processing unit 29 includes a plurality of transceivers 30-1, 30-2, and 30-3 (collectively, transceivers 30), and the transceivers 30 are coupled to one or more antennas 34-1, 34-2, and 34-3 (collectively, antennas 34). Although three transceivers 30 and three antennas 34 are illustrated in FIG. 1, the client station 25-1 includes other suitable numbers (1, 2, 3, 4, 5, etc.) of transceivers 30 and antennas 34 in other embodiments.

In some embodiments, the PHY processing unit 20 of the AP 14 is configured to generate data units conforming to a communications protocol and having corresponding formats. The transceiver(s) 21 is/are configured to transmit the generated data units via the antenna(s) 24. Similarly, the transceiver(s) 21 is/are configured to receive the data units via the antenna(s) 24. The PHY processing unit of the AP 14 is configured to process received data units conforming to the communication protocol and having corresponding formats and to determine that such data units conform to the communication protocol, according to various embodiments.

In some embodiments, the PHY processing unit 29 of the client device 25-1 is configured to generate data units conforming to the communication protocol and having corresponding formats. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the communication protocol and having corresponding formats and to determine that such data units conform to the communication protocol, according to various embodiments.

FIG. 1 further illustrates aspects of a method for motion detection, according to some embodiments described herein. As shown in FIG. 1, AP 14 transmits one or more sounding packets to client station 25-1. A feedback packet is generated at the client station 25-1 and transmitted to the AP 14. The feedback packet includes channel state information (CSI) or a compressed steering matrix (CSM) for the wireless channel between the AP 14 and the client station 25-1.

AP 14 calculates a steering matrix based on the received channel state information or compressed steering matrix from the feedback packet. Subsequent to the calculation of the steering matrix, AP 14 calculates a nulling matrix based on the calculated steering matrix. For example, as described below, AP 14 calculates the nulling matrix using the Gram-Schmidt process, or other suitable technique, for orthonormalizing the steering matrix.

AP 14 then applies the calculated nulling matrix to a plurality of packets such as short packets in the manner described above, and transmits the short packets to client station 25-1. At the client station 25-1, received signal strength information (RSSI) is determined for each of the received short packets. AP 14 receives RSSI from client station 25-1 for each of the transmitted short packets.

AP 14 then detects motion by estimating a channel energy difference based on (a) RSSIs that AP 14 receives as feedback from client station 25-1 for short packets and sounding packets previously transmitted from AP 14 to client station 25-1, and (b) channel correlation of short packets with respect to that of sounding packets, as described in further detail below. Under optimal conditions where the wireless channel conditions remain unchanged from the time when the sounding packet was transmitted, the received signal strength (RSS) at the client station 25-1 is expected to be approximately zero. However, AP 14 detects motion (or intrusion) within the home/office environment when the received RSS information and the channel correlation information indicate a change in the wireless channel condition (i.e., when the received RSS information shows a change (e.g., an increase) in the RSS value over the transmission of one or more short packets, and/or when the received channel correlation information indicates presence of a lower intensity channel perturbation). Although the above embodiment describes the processing steps being performed by AP 14, in some embodiments, the client station 25-1 can process the RSS information and detect motion without needing to transmit the RSSI to AP 14.

Figure 2:
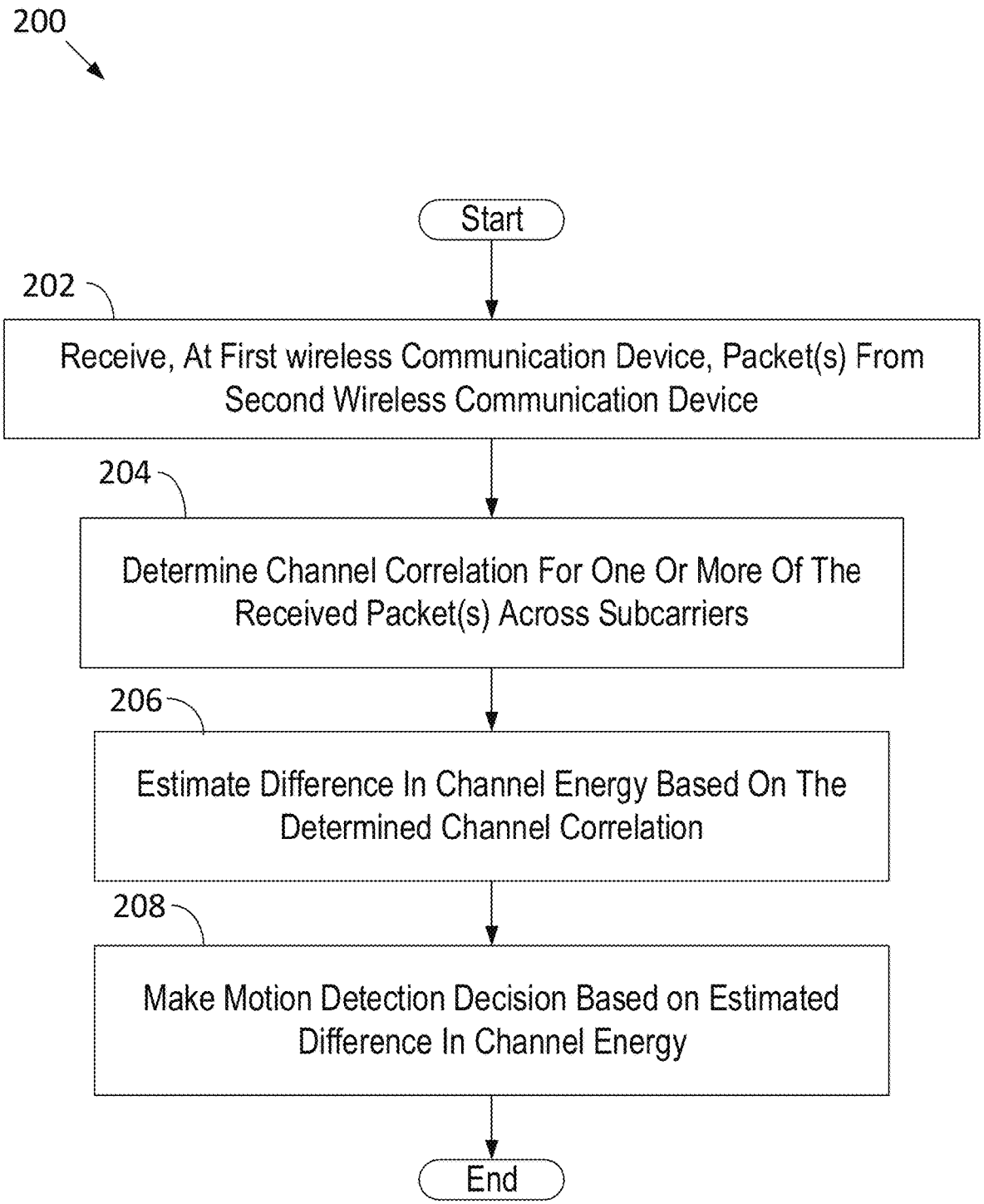
FIG. 2 is a flow diagram of a method for motion detection utilizing the wireless communication system of FIG. 1, in accordance with embodiments of the subject matter of this disclosure.

FIG. 2 is a flow diagram of a method 200 for motion detection utilizing the wireless communication system of FIG. 1, in accordance with embodiments of the subject matter of this disclosure. In general, method 200 involves estimating, for each short packet received in the time interval between receipt of two sounding packets for the case of a single receive antenna, the channel energy difference based on the channel correlation with respect to that of the reference packet (e.g., the sounding packet), according to the equations (6) below.

$$E_n = 10\log10\left(\left|\sum_{k=1}^{N-1} \hat{h}_k^{(ref)} \hat{h}_{k+1}^{(ref)H}\right|\right) - 10\log10\left(\left|\sum_{k=1}^{N-1} \hat{h}_k^{(n)} \hat{h}_{k+1}^{(n)H}\right|\right) \approx \tag{6}$$

$$10\log10\left(\sum_{k=1}^{N-1} |\hat{h}_k^{(ref)}|^2\right) - 10\log10\left(\left|\sum_{k=1}^{N-1} \hat{h}_k^{(n)} \hat{h}_{k+1}^{(n)H}\right|\right) =$$

$$10\log10\left(\sum_{k=1}^{N-1} |\hat{h}_k^{(ref)}|^2\right) - 10\log10\left(\sum_{k=1}^{N-1} |\hat{h}_k^{(n)}|^2\right) + 10\log10\left(\sum_{k=1}^{N-1} |\hat{h}_k^{(n)}|^2\right) -$$

$$10\log10\left(\left|\sum_{k=1}^{N-1} \hat{h}_k^{(n)} \hat{h}_{k+1}^{(n)H}\right|\right) \approx \underbrace{RSS(ref) - RSS(n)}_{RSS\ diff} +$$

$$\underbrace{10\log10\left(\sum_{k=1}^{N-1} |\hat{h}_k^{(n)}|^2\right) - 10\log10\left(\left|\sum_{k=1}^{N-1} \hat{h}_k^{(n)} \hat{h}_{k+1}^{(n)H}\right|\right)}_{CH\ diff}$$

where the $2^{nd}$ equality is approximated by the assumption that the original channels between two neighboring subcarriers are fully correlated for sounding packets. The $4^{th}$ equality can be approximated due to the energy difference in CSI (or LTF symbols) being similar to that in the symbol where RSS difference is measured. N is the total number of subcarriers. $\hat{h}_k^{(ref)}$ and $\hat{h}_k^{(n)}$ are the channel estimate for a reference packet and for the $n^{th}$ short packet. As described below, in various implementations, equation (6) and/or individual components of equation (6) are calculated at the AP 14 and/or at the client station device 25-1.

The RSS difference measurement between the sounding and the $n^{th}$ short packet is the same as in the transmit nulling scheme described above, while the "CH diff" calculation based on the channel of current packet further improve the detection resolution, especially for intrusions that cause a lower intensity perturbations than could otherwise be detected without using the correlation-based technique herein. The "CH diff" will be relatively larger when the channel perturbation is comparable to or below the noise/quantization level, and becomes smaller (until it reaches almost 0) when the channel perturbation increases. The statistics of channel correlation-based channel energy difference $E_n$ are used for deciding whether the intrusion happens. The $E_n$ statistics processing could happen on either side, at AP 14 and/or client station 25-1.

With reference to FIG. 2 and equations (6), at 202, the AP 14 wirelessly receives one or more packets, such as sounding packets and/or short packets, from the client station 25-1. At 204, either the AP 14 or the client station 25-1 determine a channel correlation, $10 \log 10(|\Sigma_{k=1}^{N-1} \hat{h}_k^{(n)} \hat{h}_{k+1}^{(n)H}|)$ for an $n^{th}$ short packet received from client station 25-1 across subcarriers. In some aspects, the channel correlation is calculated at the client station 25-1 instead of at the AP 14 to reduce feedback overhead. At 206, the AP 14 estimates a difference in channel energy $E_n$ based on the channel correlation determined at 204 by using equation (6). At 208, the AP 14 makes a motion detection decision based on the difference in channel energy estimated at 206.

Figure 3:
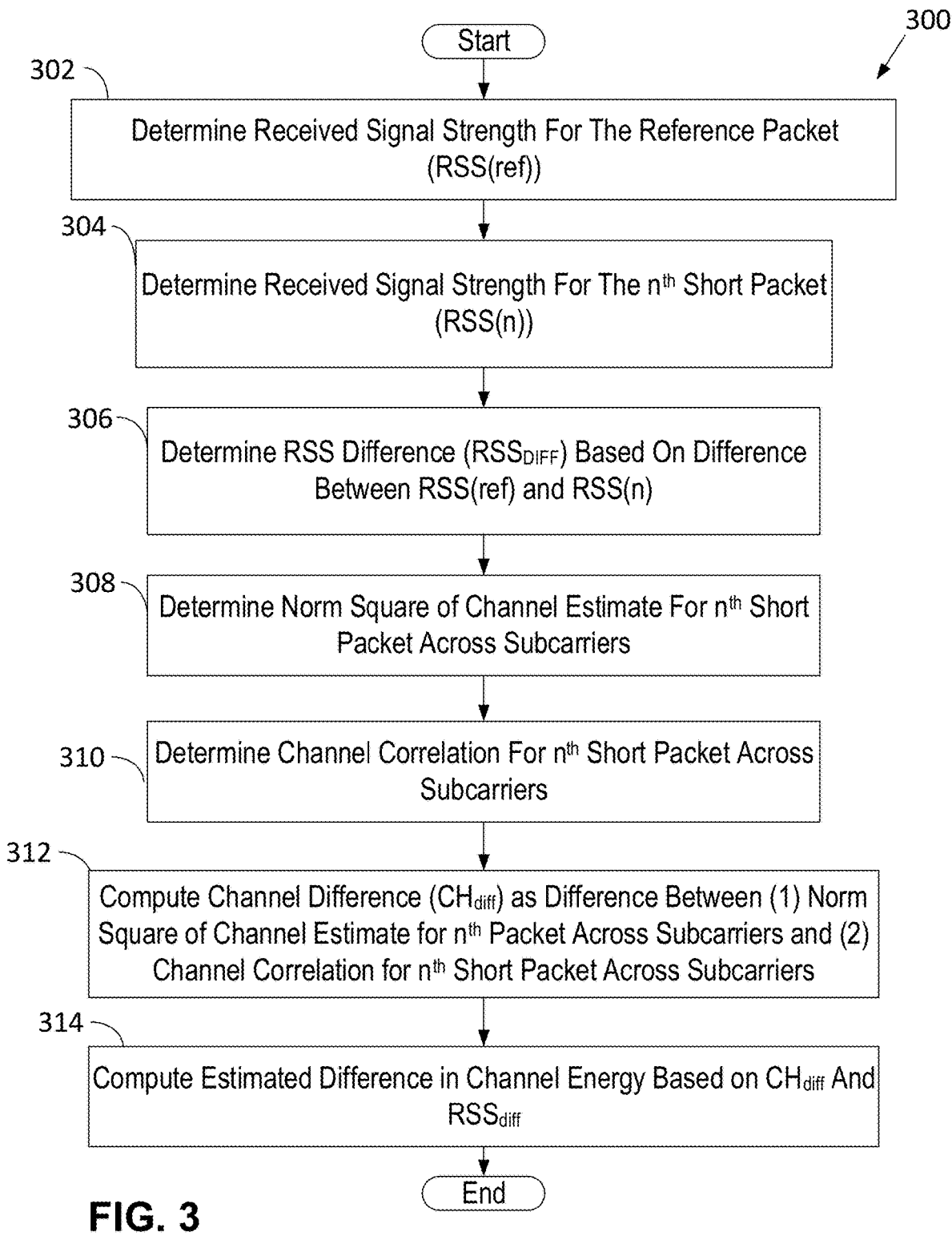
FIG. 3 is a flow diagram of a method for estimating a channel difference as part of the method of FIG. 2, in accordance with embodiments of the subject matter of this disclosure.

FIG. 3 is a flow diagram of a method 300 for estimating a channel difference as part of the method 200 of FIG. 2, in accordance with embodiments of the subject matter of this disclosure. With reference to FIG. 3 and continued reference to equation (6), at 302 the AP 14 determines a received signal strength for the reference packet (RSS(ref)), the sounding packet, for instance by receiving the RSS(ref) from the client station 25-1. At 304, AP 14 determines a received signal strength for the $n^{th}$ short packet (RSS(n)), for instance also by receiving the RSS(n) computed by the client station 25-1 and transmitted as feedback to AP 14. At 306, the AP 14 determines an RSS difference ($RSS_{DIFF}$) based on a difference between RSS(ref) and RSS(n).

At 308, client station device 25-1 determines a norm square of the channel estimate for the nth short packet across subcarriers as $10 \log 10(\Sigma_{k=1}^{N-1} |\hat{h}_k^{(n)}|^2)$. At 310, client station device 25-1 determines a channel correlation for $n^{th}$ short packet across subcarriers as $10 \log 10(\Sigma_{k=1}^{N-1} \hat{h}_k^{(n)} \hat{h}_{k+1}^{(n)H}|)$. At 312, client station device 25-1 computes, and transmits to AP 14 as feedback, a channel difference ($CH_{DIFF}$) as a difference between the norm square 10 log $10(\Sigma_{k=1}^{N-1}|\hat{h}_k^{(n)}|^2)$ and the channel correlation for the $n^{th}$ short packet $10 \log 10 \ (\Sigma_{k=1}^{N-1} \hat{h}_k^{(n)} \hat{h}_{k+1}^{(n)H}|)$. At 314, AP 14 computes an estimated difference in channel energy as a sum of $CH_{DIFF}$ and $RSS_{DIFF}$.

In some implementations, such as when client station device 25-1 lacks sufficient memory, or to enable AP 14 to detect motion based on multiple clients, client station device 25-1 computes and transmits as feedback to AP 14 RSS(n) and "CH diff(n)" for the $n^{th}$ short packet. In other implementations, such as when client station device 25-1 has sufficient memory to store RSS(ref), client device 25-1 calculates the whole equation (6) above (RSS(ref)−RSS(n)+CH diff(n)) and then provides the output as feedback to AP 14.

Figure 4:
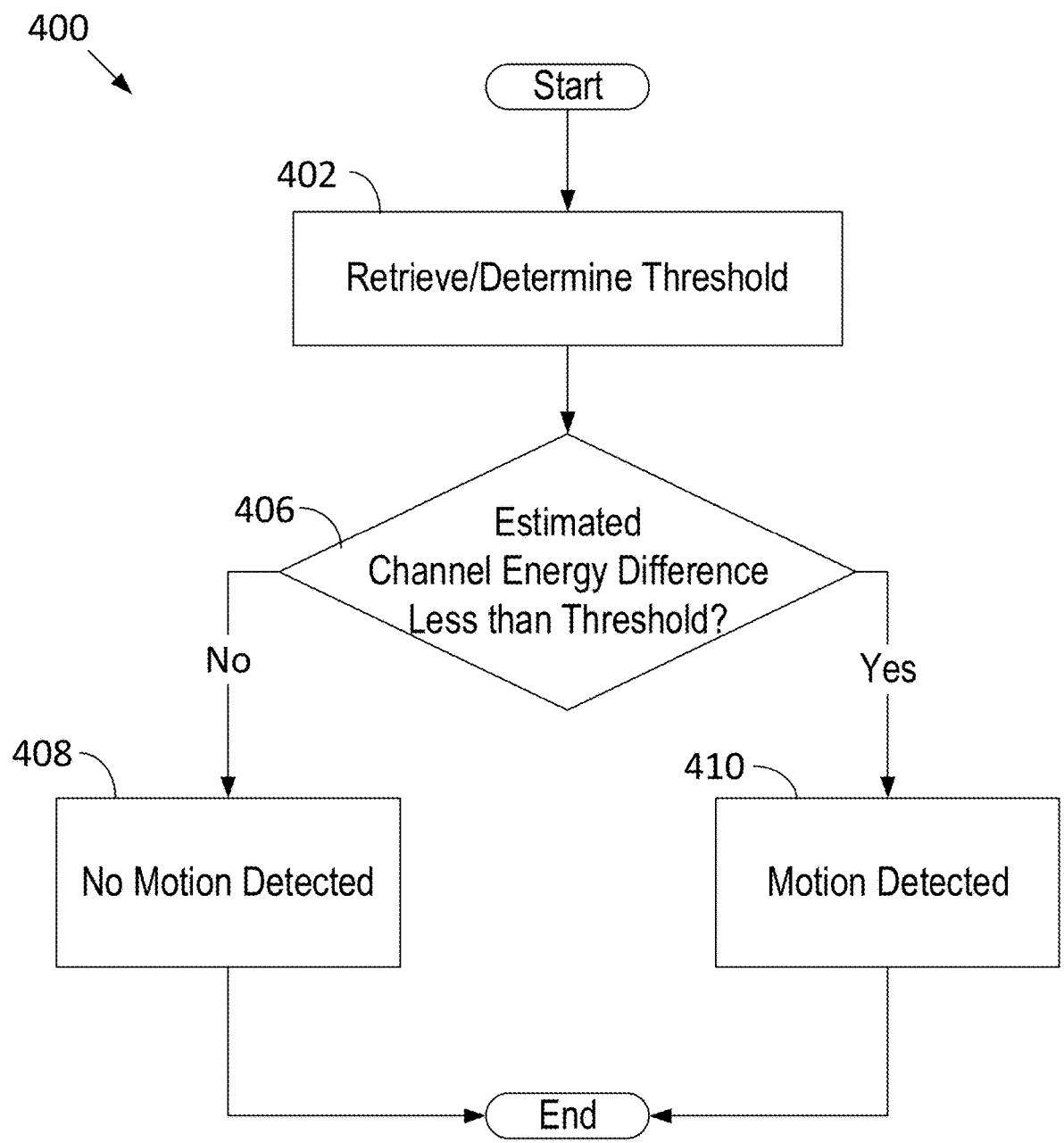
FIG. 4 is a flow diagram of a method for making a motion detection decision as part of the method of FIG. 2, in accordance with embodiments of the subject matter of this disclosure.

FIG. 4 is a flow diagram of a method 400 for making a motion detection decision as part of the method 200 of FIG. 2, in accordance with embodiments of the subject matter of this disclosure. At 402, the AP 14 retrieves (e.g., from memory) and/or determines (e.g., from statistics based on packets previously communicated between the AP 14 and the client station 25-1) a threshold to be used for motion detection decision making. At 406, AP 14 compares the channel energy difference $E_n$ determined in the manner described above to the threshold retrieved or determined at 402. If the channel energy difference $E_n$ is less than the threshold ("Yes" at 406), then at 410 the AP 14 determines that motion has been detected. If, on the other hand, the channel energy difference $E_n$ is not less than the threshold ("No" at 406), then at 412 the AP 14 determines that no motion has been detected.

Various additional modifications may be made to the correlated-based method proposed above for motion detection and still be within the scope of this disclosure. For example, if there are multiple receive antennas ($N_r$) and/or multiple spatial streams ($N_{ss}$) in the short packet, the correlation term in equation (6) will be summed over all receive antennas and spatial streams, e.g., $\Sigma_{k=1}^{N-1} \hat{h}_k^{(n)} \hat{h}_{k+1}^{(n)H}$ will be replaced by $\Sigma_{i=1}^{N_r} \Sigma_{j=1}^{N_{ss}} \Sigma_{k=1}^{N-1} \hat{h}_{i,j,k}^{(n)} \hat{h}_{i,j,k+1}^{(n)H}$.

To make the channel between neighboring subcarriers highly correlated, the initial vector $u_0$ in equation (2) above should be the same for the neighboring subcarriers used to calculate the correlation. If one still wishes to randomize the initial vector $u_0$ across the subcarriers, one can choose particular pairs of subcarriers for correlation calculation, and set the initial vector to be the same within each pair, but different among pairs. For example, we may use $\Sigma_{k=odd, k \leq N-1} \hat{h}_k^{(n)} \hat{h}_{k+1}^{(n)H}$ instead of $\Sigma_{k=1}^{N-1} \hat{h}_k^{(n)} \hat{h}_{k+1}^{(n)H}$ and use the same the initial vector $u_0$ for each pair of subcarriers k and k+1 (k is odd number), but different across pairs. Further, the "CH diff" term calculation described above could benefit from larger bandwidth since the number of subcarriers N would increase.

Additionally, the above-proposed correlated-based method for motion detection also is applicable to the receiver CSI-based scheme without a sounding procedure. In this scheme, the client station device 25-1 periodically (e.g., with interval Ts) sends a short packet to a multi-antenna AP, such as AP 14. AP 14 receives the short packet and estimates the CSI. With a larger period (e.g., Tp=M*Ts, where M is the number of short packets within the period), AP 14 chooses a CSI as reference for the processing within the next period. For example, for CSI-based decision making at a multi-antenna AP (e.g., Nr>1 and Nss=1), the energy difference between the current packet and the reference packet may be calculated according to equation (7) below.

$$E_n = 10 \log 10 \left( \sum_{i=1}^{N_r} \sum_{k=1}^{N-1} |\hat{h}_{i,k}^{(ref)}|^2 \right) - 10 \log 10 \left( \left| \sum_{i=1}^{N_r} \sum_{k=1}^{N-1} \Delta \hat{h}_{i,k}^{(n)} \Delta \hat{h}_{i,k+1}^{(n)H} \right| \right) \quad (7)$$

Where $\hat{h}_{i,k}^{(ref)}$ is the $i^{th}$ element of the reference CSI $\hat{h}_k^{(ref)}$, $\Delta h_{i,k}^{(n)} = \hat{h}_{i,k}^{(n)} - h_{i,k}^{(ref)}$ is the $i^{th}$ element of $N_r \times 1$ vector $\Delta h_k^{(n)}$ which is the absolute CSI difference between the nth short packet and the reference packet, and the auto gain control (AGC) level is assumed to be the same for all the packets such that the absolute estimated channel difference reflects the channel change. The channel change decision could be made by comparing $E_n$ (or average $E_n$ statistic over certain time) with a threshold; the intrusion caused channel change will make $E_n$ smaller compared to no intrusion case. Use of the correlation-based term instead of the norm square in equation (7) also enhances the detection resolution limited by the noise/quantization level.

Additionally, nulling based CSI difference method may also be used at a receiver, in which case the CSI difference $\Delta h_k^{(n)}$ is calculated as in equation (8) below.

$$\Delta h_k^{(n)} = G_k \cdot h_k^{(n)} \quad (8)$$

where $G_k$ is the nulling matrix which may be estimated based on the reference channel according to equation (9) below.

$$G_k = (I - g_k \cdot g_k^H), \ g_k = \frac{\hat{h}_k^{(ref)}}{\|\hat{h}_k^{(ref)}\|} \quad (9)$$

The energy difference for the nulling-based CSI may be calculated using equation (7), keeping in mind that the $\Delta h_k^{(n)}$ used in equation (8) is different from that used in the previous method. In such an aspect, the channel change decision can be made by comparing $E_n$ (or the average $E_n$ statistic over certain time) with a threshold as for the previous method described above.

Various embodiments discussed in conjunction with FIGS. 1-4 are performed by control circuitry or various electronic components of one or more electronic circuits, such as but not limited to an integrated circuit, application-specific integrated circuit (ASIC), Field Programmable Gate Array (FPGA), digital signal processors, and/or other like circuitry. In addition, or alternatively, various embodiments and components disclosed herein are configured to be at least partially operated and/or implemented by processor-executable instructions, for example firmware instructions, that are stored on one or more transitory or non-transitory processor-readable media in memory.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein are employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

Other variations are within the scope of the following claims.

What is claimed is:

1. A system for detecting motion, the system comprising:
a receiver at a first wireless communication device capable of wirelessly communicating with a second wireless communication device, the first wireless communication device configured to:
receive from the second wireless communication device via two or more subcarriers a first packet and a channel correlation for the first packet across the two or more subcarriers; and
control circuitry configured to:
estimate a channel energy difference for the receiver based on the channel correlation for the first packet; and
make a motion detection decision based on the estimated channel energy difference.

2. The system of claim 1, wherein the control circuitry is further configured to:
determine a channel correlation for a reference packet across the two or more subcarriers;
estimate the channel energy difference for the receiver by computing a difference between the channel correlation for the reference packet and the channel correlation for the first packet across the two or more subcarriers; and
make the motion detection decision based on the estimated channel energy difference.

3. The system of claim 2, wherein the control circuitry is further configured to compare the estimated channel energy difference to a threshold, and detect a presence of motion or an absence of motion based on comparison of the estimated channel energy difference to the threshold.

4. The system of claim 2, wherein the control circuitry is further configured to:
determine an average estimated channel energy difference based on a plurality of packets received by the receiver over a period of time; and
compare the estimated channel energy difference to the average estimated channel energy difference,
wherein the motion detection decision is made based on a result of the comparing the estimated channel energy difference to the average estimated channel energy difference computed over the period of time.

5. The system of claim 2, wherein the receiver is further configured to wirelessly receive, from the second wireless communication device, a feedback packet including an average estimated channel energy difference based on a plurality of packets communicated between the first and second wireless communication devices over a period of time, and
wherein the control circuitry is further configured to:
compare the estimated channel energy difference to the average estimated channel energy difference, and
make the motion detection decision based on a result of the comparing the determined channel correlation to the average estimated channel energy difference.

6. The system of claim 2, wherein the receiver is further configured to periodically receive, from the second wireless communication device, a plurality of sounding packets, including a first sounding packet and a second sounding packet, wherein the reference packet includes at least one of the first sounding packet or the second sounding packet, and wherein the first packet is received between receipt of the first sounding packet and the second sounding packet.

7. The system of claim 2, wherein the control circuitry is further configured to:
compare the estimated channel energy difference to a threshold; and
in response to determining that the estimated channel energy difference is below the threshold, determine that motion has been detected.

8. The system of claim 2, wherein the control circuitry is further configured to:
compare the estimated channel energy difference to a threshold; and
in response to determining that the estimated channel energy difference is above the threshold, determine that an absence of motion has been detected.

9. The system of claim 1, wherein the channel correlation for the first packet across the two or more subcarriers is determined by determining correlations of the first packet among adjacent subcarriers.

10. The system of claim 1, wherein the first packet is received over a first channel of the first wireless communication device, and wherein the control circuitry is further configured to make the motion detection decision based on statistical channel-correlation-based energy channel differences determined for the first channel of the first wireless communication device.

11. A method for detecting motion, the method comprising:
receiving, at a receiver of a first wireless communication device capable of wirelessly communicating with a second wireless communication device, a first packet from the second wireless communication device via two or more subcarriers;
receiving, at the receiver of the first wireless communication device, a channel correlation determined at the second wireless communication device for the first packet across the two or more subcarriers;
estimating a channel energy difference for the receiver based on the channel correlation for the first packet; and
making a motion detection decision based on the estimated channel energy difference.

12. The method of claim 11, further comprising:
determining a channel correlation for a reference packet across the two or more subcarriers;
estimating the channel energy difference for the receiver by computing a difference between the channel correlation for the reference packet and the channel correlation for the first packet; and
making the motion detection decision based on the estimated channel energy difference.

13. The method of claim 12, further comprising comparing the estimated channel energy difference to a threshold, and detecting a presence of motion based on comparison of the estimated channel energy difference to the threshold.

14. The method of claim 12, further comprising:
determining an average estimated channel energy difference based on a plurality of packets received by the receiver over a period of time; and
comparing the estimated channel energy difference to the average estimated channel energy difference,
wherein the motion detection decision is made based on a result of the comparing the estimated channel energy difference to the average estimated channel energy difference computed over the period of time.

15. The method of claim 12, further comprising:
wirelessly receiving, from the second wireless communication device, a feedback packet including an average estimated channel energy difference based on a plurality of packets communicated between the first and second wireless communication devices over a period of time;

comparing the estimated channel energy difference to the average estimated channel energy difference; and making the motion detection decision based on a result of the comparing the determined channel correlation to the average estimated channel energy difference.

16. The method of claim 12, further comprising periodically receiving, from the second wireless communication device, a plurality of sounding packets, including a first sounding packet and a second sounding packet, wherein the reference packet includes at least one of the first sounding packet or the second sounding packet, and wherein the first packet is received between receipt of the first sounding packet and the second sounding packet.

17. The method of claim 12, further comprising:

comparing the estimated channel energy difference to a threshold; and in response to determining that the estimated channel energy difference is below the threshold, determining that motion has been detected.

18. The method of claim 12, further comprising:

comparing the estimated channel energy difference to a threshold; and in response to determining that the estimated channel energy difference is above the threshold, determining that an absence of motion has been detected.

19. The method of claim 11, wherein the channel correlation for the first packet across the two or more subcarriers is determined by determining correlations of the first packet among adjacent subcarriers.

20. The method of claim 11, wherein the first packet is received over a first channel of the first wireless communication device, and wherein the motion detection decision is made based on statistical channel-correlation-based energy channel differences determined for the first channel of the first wireless communication device.

\* \* \* \* \*